Figure 2:
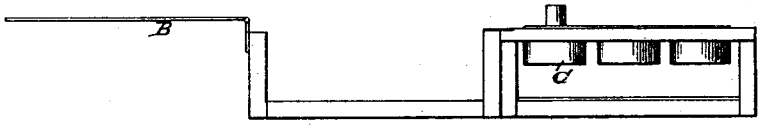
Figure 1:
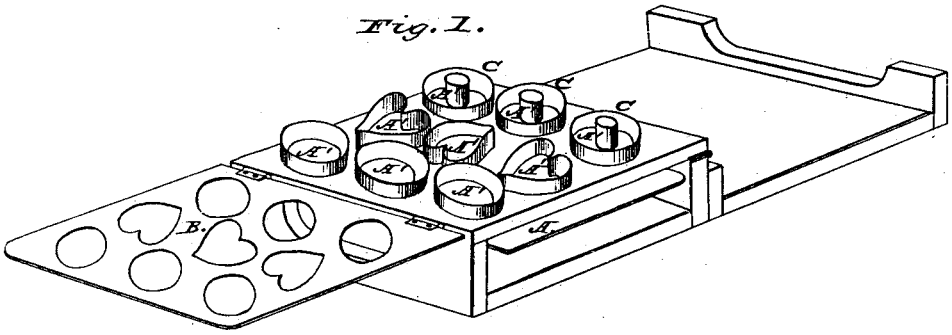
Figure 3:
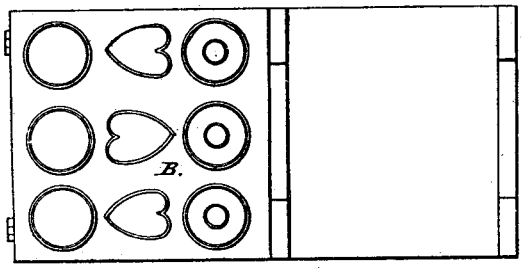

J. H. Shrote,

Cake-Cutter,

No. 286. A. I. June 26, 1860.

Witnesses:
J. G. Clayton
Chas B. Burch.

Inventor.
John H. Shrote.

N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 286 FOR THE ISSUE DATE 06/26/1860 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims